United States Patent Office.

THEOPHILUS HIGGINBOTHAM, OF HERNANDO, FLORIDA, ASSIGNOR TO HIMSELF, JOHN PARSONS, AND EBERHARD FABER, OF NEW YORK CITY.

*Letters Patent No. 71,006, dated November 19, 1867.*

IMPROVED FIBROUS MATERIAL.

The Schedule referred to in these Letters Patent and making part of the same.

TO ALL WHOM IT MAY CONCERN:

Be it known that I, THEOPHILUS HIGGINBOTHAM, of Hernando, in the county of Hernando, and in the State of Florida, have invented a new and useful Improvement in Fibrous Materials; and I do hereby declare that the following is a full, clear, and exact description thereof, which will enable those skilled in the art to make and use the same.

This invention consists in the employment or use of *Althea frutex*, or cockle-burr, for the purpose of producing fibrous materials or paper. The *Althea frutex* is a plant which grows abundantly, as a weed, in Florida and adjacent States, and which is known in that section of the country as cockle-burr. My invention is based on the discovery that the stalks of this plant, when disintegrated, produce fibres similar to the fibres of hemp, flax, or manilla grass, and fit to be worked into ropes, textile fabrics, or paper.

The disintegration of the plant is effected by passing the same through rollers, and separating the fibres from the impurities by suitable brakes and hackles similar to those used in treating hemp or flax. If desired, the plants may be treated with alkaline solutions, whereby their disintegration is materially facilitated.

The fibres obtained from this plant are equal to those of hemp, flax, or manilla grass, and they can be used with great advantage in the manufacture of ropes and textile fabrics, and, if desired, they may also be used for manufacturing paper.

What I claim as new, and desire to secure by Letters Patent, is—

Producing from the plant known as the *Althea frutex*, or cockle-burr, fibres fit for ropes, textile fabrics, or paper, substantially as set forth.

This specification signed by me this twenty-sixth day of March, 1867.

THEOPHILUS HIGGINBOTHAM.

Witnesses:
   W. J. BARNETT,
   WILLIAM M. GARRISON.